United States Patent
Morita et al.

(10) Patent No.: US 7,007,012 B2
(45) Date of Patent: Feb. 28, 2006

(54) PROCESS FOR SEARCHING FOR FILES WHEN DRIVE CONFIGURATIONS OF PROCESSING APPARATUSES ARE CHANGED

(75) Inventors: Toshihiro Morita, Kanagawa (JP); Mitsuru Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 09/974,383

(22) Filed: Oct. 10, 2001

(65) Prior Publication Data

US 2002/0069205 A1   Jun. 6, 2002

(30) Foreign Application Priority Data

Oct. 12, 2000   (JP)   .............................. 2000-311797

(51) Int. Cl.
G06F 17/30   (2006.01)
(52) U.S. Cl. ...................... 707/3; 707/10; 707/104.1; 707/102; 709/203; 709/219
(58) Field of Classification Search ................ 707/3, 707/202, 10, 102, 104.1; 709/203, 219
See application file for complete search history.

(56) References Cited

U.S. PATENT DOCUMENTS 5,530,856 A * 6/1996 Dahod et al. ............ 707/104.1
5,913,218 A * 6/1999 Carney et al. ............. 707/200
6,356,971 B1 * 3/2002 Katz et al. .................. 710/301
6,601,139 B1 * 7/2003 Suzuki ....................... 711/115

OTHER PUBLICATIONS

Anonymous, "Generic Filename Resolver", IBM Technical Disclosure Bulletin, Sep. 1995, US, pp. 369-372.*

* cited by examiner

Primary Examiner—Khanh Pham
(74) Attorney, Agent, or Firm—Oblon, Spivak, McClelland, Maier & Neustadt, P.C.

(57) ABSTRACT

A music piece managing unit judges whether or not a music piece file name corresponding to a music piece ID received from a playing processing unit exists in a corresponding music piece file storing unit, and in the event that judgment is made that the file name does not exist, a drive letter in the obtained file name is changed to the drive letter of a currently-connected drive, thereby generating a new file name. The music piece managing unit then judges whether or not the newly-generated file name exists in the corresponding music piece file storing unit, and in the event that judgment is made that the file name exists, the file name of the music piece is updated to the newly-generated file name. Thus, music piece files can be readily searched for, even in the event that the configuration of the drives has been changed.

10 Claims, 7 Drawing Sheets

FIG. 4

| ID | MUSIC PIECE NAME | FILE NAME |
|---|---|---|
| 1 | Song-A | F:¥My Music¥Album¥01-Song-a.omg |
| 2 | Song-B | F:¥My Music¥Album¥02-Song-b.omg |
| 3 | Song-C | F:¥My Music¥New¥01-Song-c.omg |
| ⋮ | ⋮ | ⋮ |

PROCESS FOR SEARCHING FOR FILES WHEN DRIVE CONFIGURATIONS OF PROCESSING APPARATUSES ARE CHANGED

BACKGROUND OF THE INVENTION

1. Field of the Invention

The present invention relates to an information processing apparatus and method, and program storing medium, and particularly relates to an information processing apparatus and method, and program storing medium, wherein a desired file can be readily searched for even in the event that the drive configuration has been changed.

2. Description of the Related Art

With home network systems such as the IEEE (The Institute of Electrical and Electronics Engineers) 1394 serial bus and the like, multiple removable disk devices can be connected, and multiple files (e.g., music piece files) can be stored in each removable disk device.

With such home network systems, a great number of music piece files are managed by a database so that the user can immediately know in which of the multiple removable disk devices a music piece file is stored in the event of searching for a desired music piece file.

There have conventionally been applications for managing such great numbers of music piece files with databases, and great numbers of music piece files are managed by storing the full path name of the music piece file (i.e., drive letter and path name) in the database, for example.

However, with home network systems, there is a good chance that a removable disk device which is currently connected will be disconnected and reconnected at some time, and that a new removable disk device will be connected, meaning that the drive letter of the removable disk device might be changed.

Accordingly, in the event that the drive configuration of the removable disk devices are changed by adding or removing devices, there is mismatching between the drive letters of the music piece files at the time of registration and the current drive configuration of the removable disk devices, leading to problems in that the desired music piece file cannot be found.

SUMMARY OF THE INVENTION

The present invention has been made in light of the above problem, and accordingly, it is an object of the present invention to enable music piece files to be readily and speedily searched for even in the event that the drive configuration is changed.

According to a first aspect of the present invention, an information processing apparatus comprises: first obtaining means for obtaining a file name of data, based on identification information of the data, in the event that there is a search request for the data; first searching means for accessing a corresponding the other device, based on a drive identification symbol contained in the file name obtained by the first obtaining means, and searching the data stored therein; second obtaining means for obtaining drive information of the plurality of other devices connected to the network, in the event that the data is not found as the result of searching with the first searching means; generating means for changing the drive identification symbol contained in the file name, based on the drive information obtained by the second obtaining means, and generating a new file name; and second searching means for accessing the other device connected to the network, based on the new file name generated by the generating means, and searching the data stored therein.

The information processing apparatus according to the present invention may further comprise storing means for storing the data identification information and the file name, wherein the first obtaining means obtains the file name stored in the storing means, based on the data identification information regarding which there has been a search request.

The information processing apparatus according to the present invention may further comprise notifying means for notifying the file name obtained by the first obtaining means in the event that the data is found as the result of searching by the first searching means, and may further comprise notifying means for notifying a new file name generated by the generating means in the event that the data is found as the result of searching by the second searching means.

The information processing apparatus according to the present invention may further comprise notifying means for making notification to the effect that a search has failed in the event that the data is not found as the result of searching by the second searching means.

The file name may be a path name containing the drive identification symbol.

According to a second aspect of the present invention, an information processing method comprises: a first obtaining step for obtaining a file name of the data, based on identification information of the data, in the event that there is a search request for the data; a first searching step for accessing a corresponding the other device, based on a drive identification symbol contained in the file name obtained by the processing in the first obtaining step, and searching the data stored therein; a second obtaining step for obtaining drive information of the plurality of other devices connected to the network, in the event that the data is not found as the result of searching by the processing in the first searching step; a generating step for changing the drive identification symbol contained in the file name, based on the drive information obtained by the processing in the second obtaining step, and generating a new file name; and a second searching step for accessing the other device connected to the network, based on the new file name generated by the processing in the generating step, and searching the data stored therein.

According to a third aspect of the present invention, a program stored in a program storing medium comprises: code for a first obtaining step for obtaining a file name of the data, based on identification information of the data, in the event that there is a search request for the data; code for a first searching step for accessing a corresponding the other device, based on a drive identification symbol contained in the file name obtained by the processing in the first obtaining step, and searching the data stored therein; code for a second obtaining step for obtaining drive information of the plurality of other devices connected to the network, in the event that the data is not found as the result of searching by the processing in the first searching step; a generating step for changing the drive identification symbol contained in the file name, based on the drive information obtained by the processing in the second obtaining step, and generating a new file name; and code for a second searching step for accessing the other device connected to the network, based on the new file name generated by the processing in the generating step, and searching the data stored therein.

With the information processing apparatus and method, and program stored in the program storing medium, according to the present invention, in the event that there is a data search request, a data file is obtained based on data identification information, and data stored in a corresponding other device is searched for based on a drive identification symbol contained in the obtained file name. In the event that, as the results of the search the data is not found, drive information of other multiple drives connected to the network is obtained, a new file name with the drive identification symbol contained in the file name change is generated based on the obtained drive information, and data stored in the other devices connected to the network is searched, based on the generated new file name.

BRIEF DESCRIPTION OF THE DRAWINGS

FIG. 4 is a diagram illustrating an example of data recorded in the database shown in FIG. 3;

DESCRIPTION OF THE PREFERRED EMBODIMENTS

Figure 1:
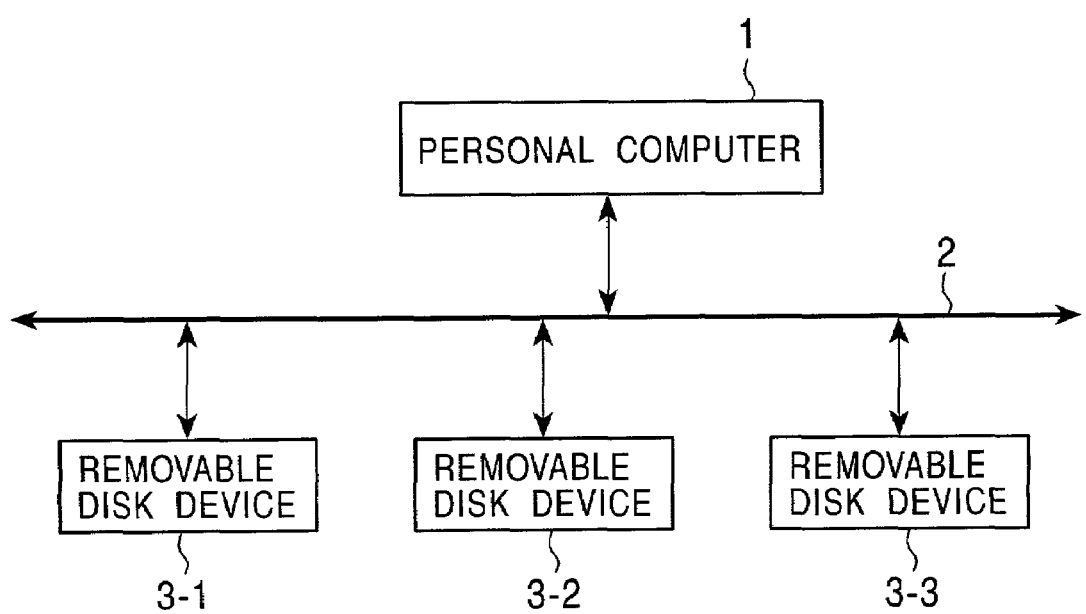
FIG. 1 is a diagram illustrating a configuration example of an embodiment of the home network system according to the present invention.

FIG. 1 is a diagram illustrating a configuration example of an embodiment of the home network system according to the present invention. As shown in the figure, with this home network system, a personal computer 1 is connected to removable disk devices 3-1 through 3—3 via an IEEE 1394 serial bus 2.

The personal computer 1 converts the data of music received from an unshown server (hereafter referred to as "music piece file") into a predetermined compression format (e.g. ATRAC3 (Adaptive Transform Acoustic Coding 3) (a Registered Trademark)), encrypts the data with an encryption method such as DES (Data Encryption Standard), and records the data. The personal computer 1 also supplies the encrypted and recorded music piece file to each of the connected removable disk devices 3-1 through 3—3 via the IEEE 1394 serial bus 2, where it is recorded.

The removable disk devices 3-1 through 3—3 store music piece files supplied from the personal computer 1 via the IEEE 1394 serial bus 2. Hereafter, the removable disk devices 3-1 through 3—3 will be referred to simply as "removable disk device 3", unless there is some need to distinguish between the removable disk devices 3-1 through 3—3.

Figure 2:
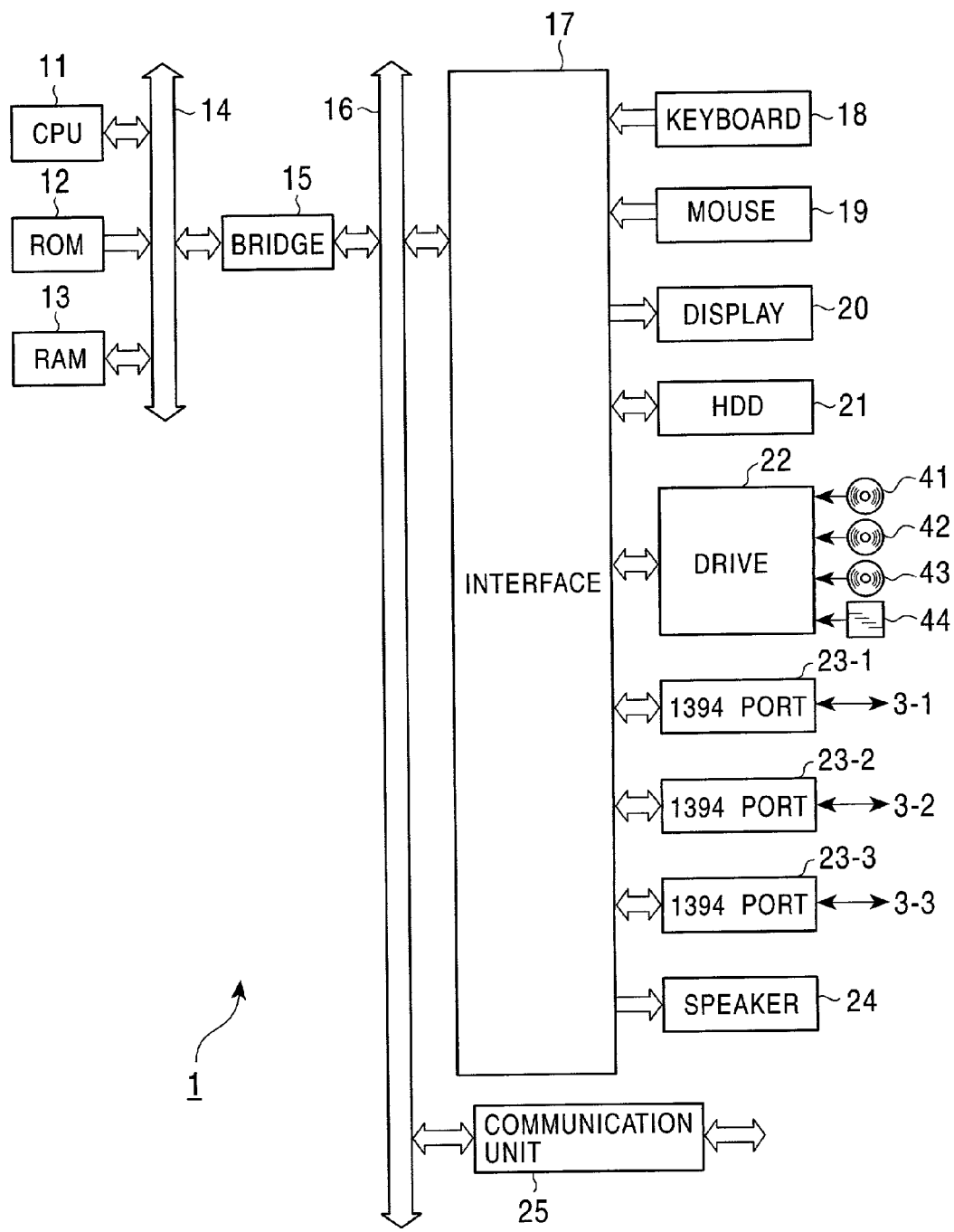
FIG. 2 is a block diagram illustrating a configuration example of the interior of the personal computer shown in FIG. 1.

FIG. 2 is a block diagram illustrating a configuration example of the interior of the personal computer 1.

A CPU (Central Processing Unit) 11 performs the actual execution of various application programs and the Operating System. ROM (Read-Only Memory) 12 generally stores, of the programs used by the CPU 11 and parameters used for computation, the fixed data. RAM (Random-Access Memory) 13 stores programs used for executing by the CPU 11 and parameters which change according to the execution thereof. These are mutually connected by a host bus 14 configured of a CPU bus or the like.

The host bus 14 is connected to an external bus 16 such as a PCI (Peripheral Component Interconnect/Interface) bus or the like via a bridge 15.

A keyboard 18 is operated by the user when inputting various instructions to the CPU 11. A mouse 19 is operated by the user when pointing instructions or selections on the screen shown on a display 20. The display 20 comprises a liquid crystal display device or CRT (Cathode Ray Tube) or the like, for displaying various types of information in text and images. A HDD (Hard Disk Drive) 21 drives hard disks, and records programs to be executed by the CPU 11 and information therein and reproduces the programs and information therefrom.

A drive 22 reads out data or programs recorded on magnetic disks 41, optical disks (including CDs) 42, magneto-optical disks 43, or semiconductor memory 44, which are mounted as necessary, and supplies the data or programs to RAM which is connected thereto via an interface 17, the external bus 16, the bridge 15, and the host bus 14.

The removable disk device 3-1 is connected to a 1394 port 23-1 via the IEEE 1394 serial bus 2, the removable disk device 3-2 is connected to a 1394 port 23-2 via the IEEE 1394 serial bus 2, and the removable disk device 3—3 is connected to a 1394 port 23-3 via the IEEE 1394 serial bus 2. The 1394 ports 23-1 through 23-3 output music piece files supplied from the CPU 11, RAM 13, or HDD 21, to the respective removable disk devices 3-1 through 3—3, via the interface 17, external bus 16, bridge 15, or host bus 14.

A speaker 24 outputs predetermined audio corresponding to a music piece file, based audio signals supplied from the interface 17.

The keyboard 18, mouse 19, display 20, HDD 21, drive 22, 1394 ports 23-1 through 23-3, and speaker 24, are connected to the interface 17, and the interface 17 is connected to the CPU 11 via the external bus 16, bridge 15, and host bus 14. Hereafter, the 1394 ports 23-1 through 23-3 will be referred to simply as "1394 port 23", unless there is some need to distinguish between the 1394 ports 23-1 through 23-3.

A communication unit 25 has an unshown network connected thereto, for storing data supplied from the CPU 11 or HDD 21 (e.g., a request for transmitting a music piece file) in packets of a predetermined format which are then transmitted via the network, and also for outputting music piece files stored in packets received via the network to the CPU 11, RAM 13, or HDD 21. The communication unit 25 is connected to the CPU 11 via the external bus 16, bridge 15, and host bus 14.

Figure 3:
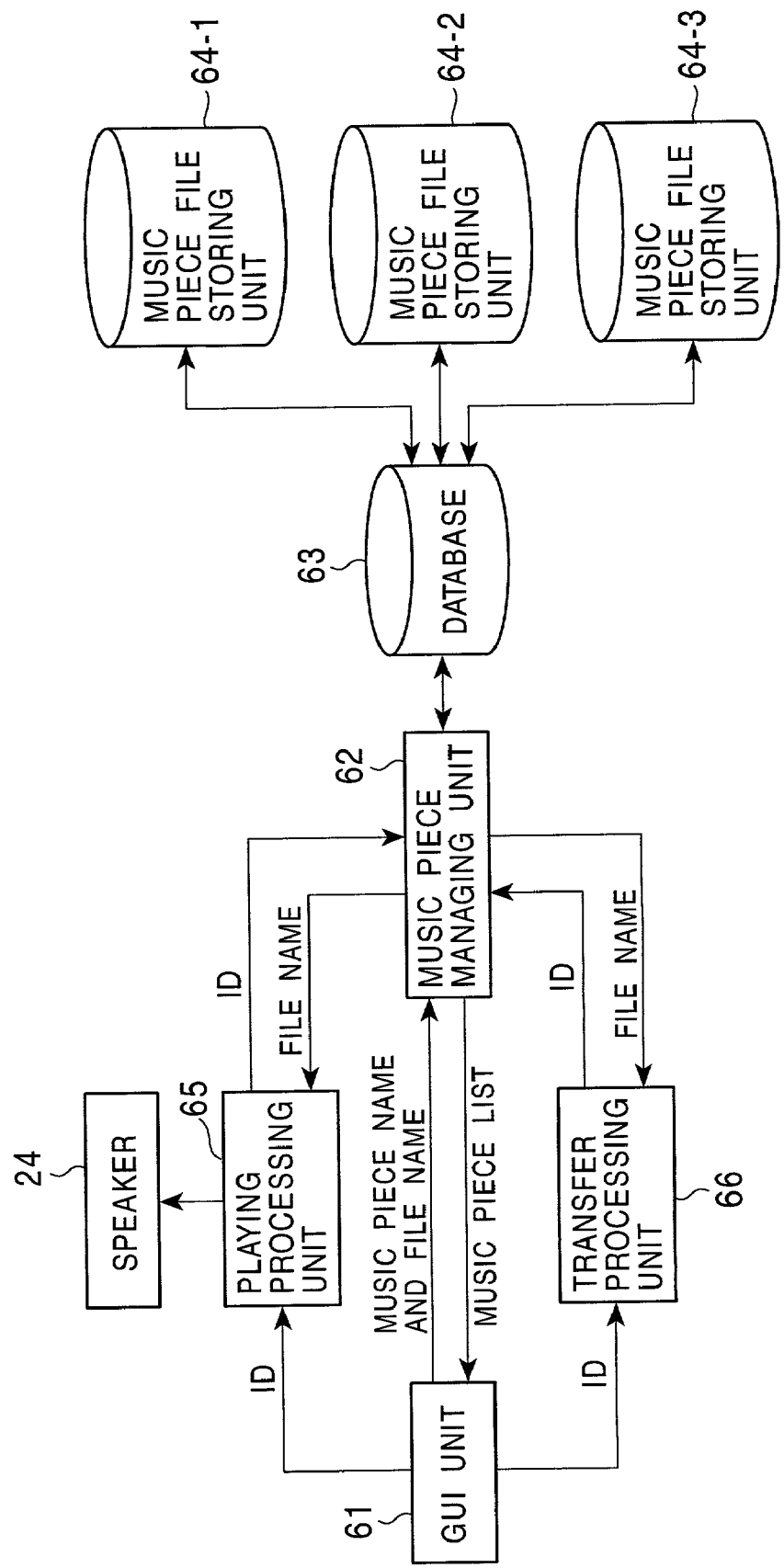
FIG. 3 is a block diagram describing the functions of the personal computer shown in FIG. 1.

FIG. 3 is a block diagram illustrating the functions of the personal computer 1 realized by the CPU 11 executing a music piece file managing program.

A GUI (Graphical User Interface) unit 61, in response to operation of the keyboard 18 or mouse 19 by the user, supplies music piece titles or file names (full path name formed of drive letter and path name) indicating where the music piece title or music piece file is stored, corresponding to the music piece file which the user desires, to a music piece managing unit 62, and request registration of the music piece file. The GUI unit 61 also obtains information relating to the music piece file, e.g., music piece ID, music piece title, artist name, etc., from the music piece managing unit 62, and displays a music piece list of the music piece ID, music piece title, artist name, etc., on the display 20.

The GUI unit 61 also supplies a music piece ID corresponding to a music piece file regarding which playing has been request (i.e., a selected music piece) to a playing processing unit 65 in the event that a playing of a certain music piece file displayed in the music piece list has been selected by user operations, and requests playing of the music piece file.

The GUI unit 61, when requested by user operations to transfer a certain music piece file displayed in the music piece list, supplies a music piece ID corresponding to the music piece file regarding which transfer has been requested to a transfer processing unit 66, thereby requesting transfer of the music piece file.

The music piece managing unit 62 records in a database 63 data such as music piece titles corresponding to music piece files and file names corresponding to the music piece files, and also reads out music piece titles or file names or the like recorded. The music piece managing unit 62 also, upon receiving of a music piece title or file name from the GUI unit 61, adds a record to the database 63, and records a music piece title or file name as a record item. The music piece managing unit 62 also reads out from the database 63 all music piece titles and all music piece IDs recorded in the database 63 therefrom in response to requests from the GUI unit 61, and supplies these to the GUI unit 61.

In the event that a music piece ID is supplied from the playing processing unit 65, the music piece managing unit 62 reads out the file name corresponding to the music piece ID from the database 63, and supplies the file name regard out to the playing processing unit 65. In the event that a music piece ID has been supplied from the transfer processing unit 66, the music piece managing unit 62 reads out a file name corresponding to the music piece ID from the database 63, and supplies the file name read out to the transfer processing unit 66.

In response to the request from the playing processing unit 65 or transfer processing unit 66, the music piece managing unit 62 searches for the music piece file corresponding to the file name from music piece file storing units 64-1 through 64-3, based on the file name obtained from the database 63. The music piece managing unit 62 also supplies the music piece files read out from the music piece file storing units 64-1 through 64-3 to the playing processing unit 65 or transfer processing unit 66, or changes the file name of music piece files and supplies the music piece files to the playing processing unit 65 or transfer processing unit 66.

The database 63 records information relating to the music piece files, such as music piece ID, music piece title, file name, or other such attributes. The database 63 is stored in the HDD 21.

The music piece file storing units 64-1 through 64-3 are each made up of external storage devices of the removable disk devices 3-1 through 3—3, storing music piece files as files. The music piece file storing units 64-1 through 64-3 can also store one or more files corresponding to each music piece file. Each of the music piece file storing units 64-1 through 64-3 correspond to a drive letter (device identification symbol), for example. The drive letters corresponding to the music piece file storing units 64-1 through 64-3 may be changed.

There are cases wherein one or more files corresponding to each music piece is recorded in each of the music piece file storing units 64-1 through 64-3.

Upon request from the GUI unit 61 for playing a music piece file, the playing processing unit 65 supplies the music piece ID corresponding to the music piece file regarding which playing has been requested, to the music piece managing unit 62, and requests to be provided with the file name of the music piece file corresponding to the music piece ID. Upon obtaining the file name from the music piece managing unit 62, the playing processing unit 65 obtains the music piece file from the music piece file storing units 64-1 through 64-3 via the music piece managing unit 62 and the database 63. In the event that the obtained music piece file has been enciphered, the playing processing unit 65 further deciphers this to plaintext, and moreover deciphers the enciphered music piece file, so that the audio data is supplied to the speaker 24 from which it is output.

Upon request from the GUI unit 61 for transferring a music piece file, the transfer processing unit 66 supplies the music piece ID corresponding to the music piece file regarding which transferring has been requested, to the music piece managing unit 62, and requests to be provided with the file name corresponding to the music piece file. Upon obtaining the file name from the music piece managing unit 62, the transfer processing unit 66 obtains the music piece file from the music piece file storing units 64-1 through 64-3 via the music piece managing unit 62 and the database 63. After receiving the music piece file, the transfer processing unit 66 executes mutual verification processing with unshown external equipment, and in the event that mutual verification is made, the music piece file along with data relating to the music piece file is supplied to the external equipment.

Also, the mutual verification processing may be executed at the point that the external equipment is connected to the personal computer 1.

FIG. 4 is a diagram illustrating an example of data which the database 63 records. The database 63 is, for example, a relational database, and manages data corresponding to the music piece title and file name.

Now, a music piece ID is an identifier having a unique value for each music piece file, wherein the music piece title is the name (title) of the music piece file, and the file name is data indicating a file name containing, for example, a path consisting of a drive name and folder name.

In the example shown in FIG. 4, the music piece titles are made up of, for example, records consisting of music piece ID items and file name items, wherein each music piece title is stored in a manner corresponding to a music piece ID.

That is to say, for the music piece ID 1, the music piece title "Song-A" is recorded (stored) along with the file name F:¥My Music¥Album¥01-Song-a.omg, for the music piece ID 2 the music piece title "Song-B" is recorded along with the file name F:¥My Music¥Album¥02-Song-b.omg, and for the music piece ID 3 the music piece title "Song-C" is recorded along with the file name F:¥My Music¥New¥03-Song-c.omg.

Figure 5:
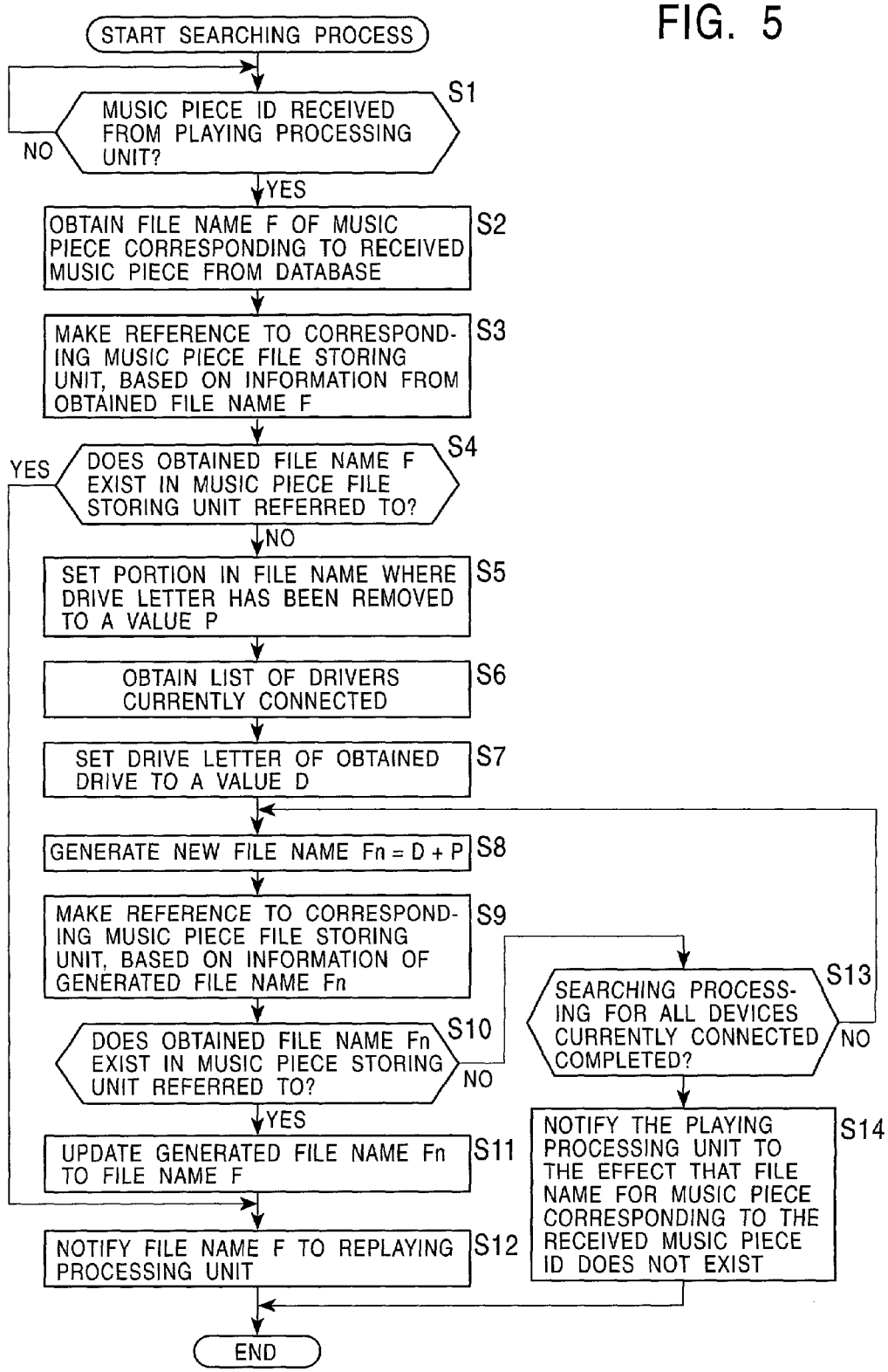
FIG. 5 is a flowchart illustrating the searching process.

Next, the searching processing for searching for a file name of a music piece file which is executed by the music piece managing unit 62 will be described with reference to the flowchart shown in FIG. 5. In order to facilitate understanding of the description, the drive letter of the music piece file storing unit 64-1 will be described as being "F", the drive letter of the music piece file storing unit 64-2 as "G", and the drive letter of the music piece file storing unit 64-3 as "H".

In step S1, the music piece managing unit 62 which executes the music piece managing program judges whether or not a music piece ID has been received from the playing processing unit 65, and stands by until a music piece ID is received from the playing processing unit 65. Once judgment is made that a music piece ID (e.g., music piece ID=1) as been received from the playing processing unit 65, the flow proceeds to step S2 and the music piece managing unit 62 obtains the file name F of the music piece corresponding to the music piece ID received by the processing of step S1

(in the case of the example shown in FIG. 4, the music piece file name "F:¥My Music¥Album¥01-Song-a.omg") from the database 63.

In step S3, the music piece managing unit 62 makes reference to a corresponding music piece file storing unit 64-1 through 64-3, based on the information of the music piece file name F (F:¥My Music¥Album¥01-Song-a.omg) obtained by the processing in step S2. In this case, the drive letter is F, so reference is made to the music piece file storing unit 64-1.

In step S4, the music piece managing unit 62 judges whether or not the music piece file name F (F:¥My Music¥Album¥01-Song-a.omg) obtained by the processing in step S2 exists in the music piece file storing unit 64-1 referred to by the processing in step S3.

In step S4, in the event that judgment is made that the music piece file name F (F:¥My Music¥Album¥01-Song-a.omg) obtained by the processing in step S2 does not exist in the music piece file storing unit 64-1 referred to by the processing in step S3, the flow proceeds to step S5, and the music piece managing unit 62 sets the portion of the file name F received by the processing in step S2 from which the drive letter has been deleted, with a value P. That is, "My Music¥Album¥01-Song-a.omg", which is the portion of the file name "F:¥My Music¥Album¥01-Song-a.omg" from which the drive letter F has been removed, is set to a value P.

In step S6, the music piece managing unit 62 obtains list information of drives currently connected to the home network. That is, in this case, the music piece file storing unit 64-1 with the drive letter F (drive F), the music piece file storing unit 64-2 with the drive letter G (drive G), and the music piece file storing unit 64-3 with the drive letter K (drive H), are obtained. However, the drive F has already ended with the searching processing, so even though drive information is obtained here, it is not used in the processing described next.

In step S7, the drive letters of the drive G and drive H obtained by the processing in step S6 are set to a value D. In step S8, the music piece managing unit 62 generates a new file name Fn=D+P from the value P set by the processing in step S5 and the value D set by the processing in step S7. That is to say, in this case, a file name Fn=G+¥My Music¥Album¥01-Song-a.omg=G:¥My Music¥Album¥01-Song-a.omg is generated.

In step S9, the music piece managing unit 62 makes reference to the corresponding music piece file storing unit 64-1 through 64-3, based on the information of the file name Fn (G:¥My Music¥Album¥01-Song-a.omg) generated by the processing in step S8. In this case, the drive letter is G, so reference is made to the music piece file storing unit 64-2.

In step S10, the music piece managing unit 62 judges whether or not the file name Fn (G:¥My Music¥Album¥01-Songa.omg) generated by the processing in step S8 exists in the music piece file storing unit 64-2 referred to by the processing in step S9.

In step S10, in the event that judgment is made that the file name Fn (G:¥My Music¥Album¥01-Song-a.omg) obtained by the processing in step S8 does not exist in the music piece file storing unit 64-2 referred to by the processing in step S9, the processing proceeds to step S13.

In step S13, the music piece managing unit 62 judges whether or not the searching processing has ended for all drives currently connected to the home network, and in the event that judgement is made that the searching processing has not yet ended for all drives currently connected to the home network, the flow returns to step S8, and the above-described subsequent processing is repeated.

In the event that judgement is made in step S13 that the searching processing has ended for all drives currently connected to the home network, the flow proceeds to step S14, and the music piece managing unit 62 makes notification to the playing processing unit 65 to the effect that the file name of the music piece corresponding to the received music piece ID does not exist.

In step S10, in the event that judgment is made that the file name Fn (G:¥My Music¥Album¥01-Song-a.omg) obtained by the processing in step S8 exists in the music piece file storing unit 64-2 referred to by the processing in step S9, the processing proceeds to step S11, and the music piece managing unit 62 updates the file name Fn generated by the processing in step S8 to a new file name F. That is, the file name recorded at the time of registration was "F:¥My Music¥Album¥01-Song-a.omg" since the drive letter at that point was F, but the drive letter has been changed to G due to attaching or removing drives and so forth, so the file name is updated to a new file name "G:¥My Music¥Album¥01Song-a.omg".

In step S4, in the event that judgment is made that the file name F obtained by the processing in step S2 exists in the music piece file storing unit 64-1 referred to by the processing in step S3, the flow proceeds to step S12.

Following the processing in step S4 or step S11, the music piece managing unit 62 notifies the file name F to the playing processing unit 65 in step S12.

Thus, the music piece managing unit 62 reads out the file name corresponding to the received music piece ID from the database 63, and makes a search based thereupon whether or not the music piece file exists in the corresponding drive. In the event that the music piece file does not exist in the drive, a file name wherein the drive letter is change is newly generated, and corresponding drives are searched based thereupon. Thus, music piece files can be searched for in a short time even in the event that the drive letter of the music piece file is changed to a drive letter other than that at the time of registration.

Also, the above-described searching processing can be applied in cases wherein the music piece managing unit 62 receives a music piece ID from the transfer processing unit 66, as well.

Figure 6:
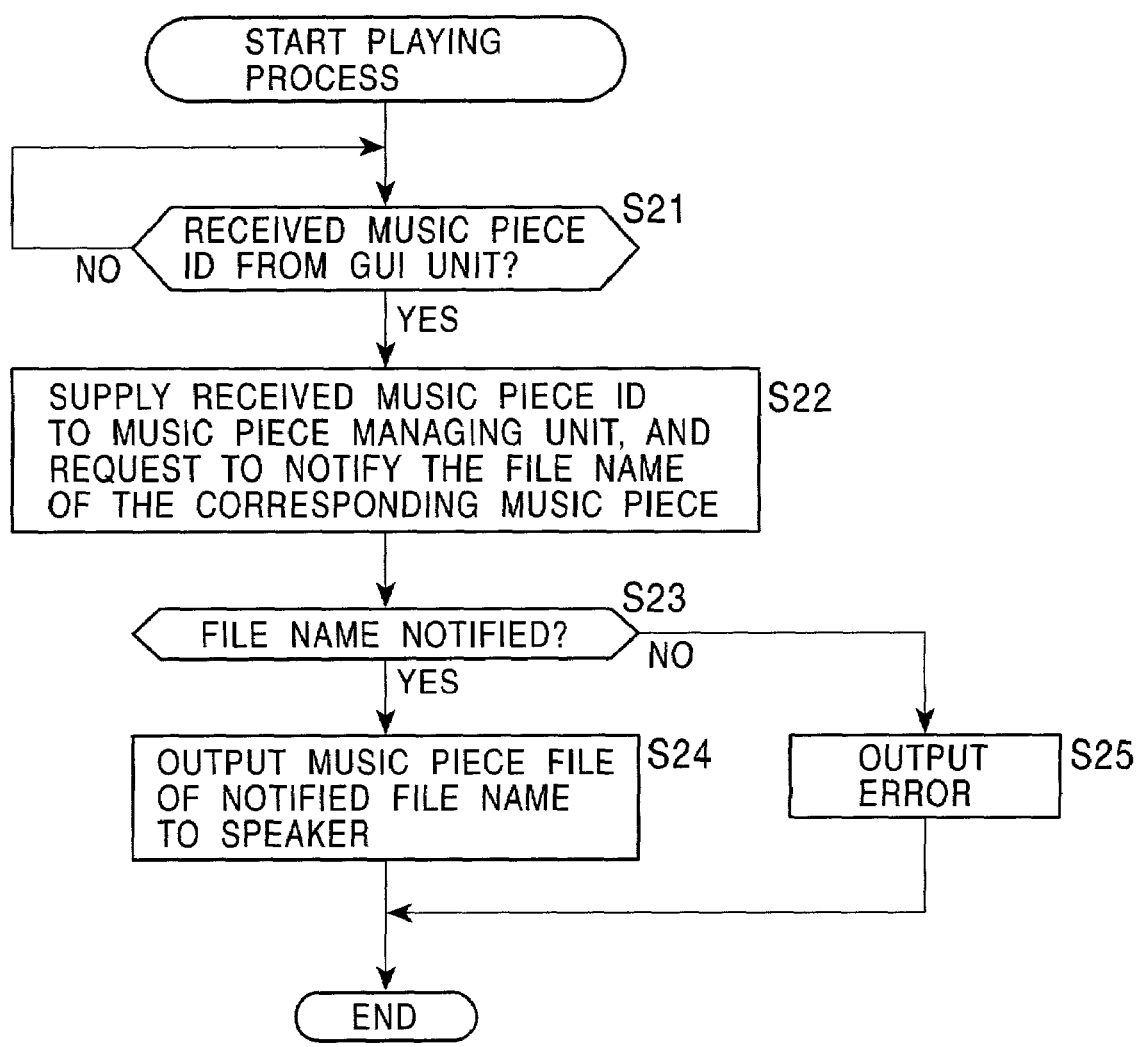
FIG. 6 is a flowchart illustrating the playing process.

Next, the music piece file playing processing executed by the playing processing unit 65 will be described with reference to the flowchart shown in FIG. 6.

In step S21, the playing processing unit 65 judges whether or not a music piece ID has been received from the GUI unit 61, and stands by until judgment is made that a music piece ID has been received from the GUI unit 61. Once judgment is made that a music piece ID has been received from the GUI unit 61, the flow proceeds to step S22, the playing processing unit 65 supplies the music piece ID received by the processing in step S21 to the music piece managing unit 62, and a request is made to notify the file name of the corresponding music piece.

In step S23, the playing processing unit 65 judges whether on not the file name has been notified by the music piece managing unit 62, and in the event that judgment is made that the file name has been notified, the flow proceeds to step S24. In step S24, the playing processing unit 65 reads out the music piece file corresponding to the file name notified by the processing in step S23 from one of the music piece file storing units 64-1 through 64-3 via the music piece managing unit 62 and the database 63, which is output to the speaker 24 and played.

In step S23, in the event that judgment is made that the file name has not been notified by the music piece managing unit 62, i.e., in the event that judgment is made that notification has been made to the effect that the corresponding file name does not exist, the flow proceeds to step S25, and the playing processing unit 65 issues an error and stops the process, so the processing ends.

Thus, the playing processing unit 65 supplies the music piece ID to the music piece managing unit 62, and a request is made for notification of the file name of the music piece file corresponding to the music piece ID, whereby the music piece file is read out from the notified file name, and can be played on the speaker 24.

Figure 7:
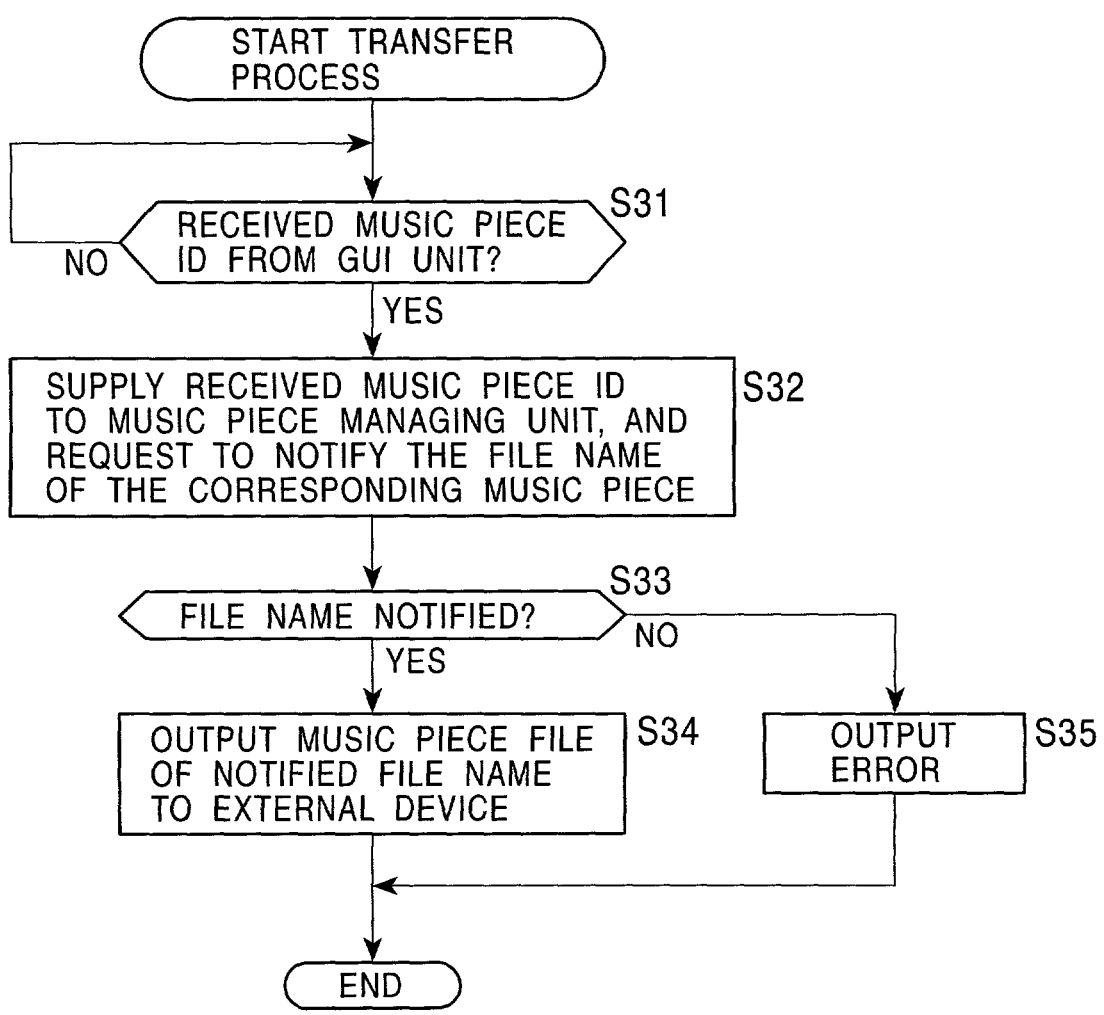
FIG. 7 is a flowchart illustrating the transferring process.

Next, the music piece file transfer processing executed by the transfer processing unit 66 will be described with reference to the flowchart shown in FIG. 7.

In step S31, the transfer processing unit 66 judges whether or not a music piece ID has been received from the GUI unit 61, and stands by until judgment is made that a music piece ID has been received from the GUI unit 61. Once judgment is made that a music piece ID has been received from the GUI unit 61, the flow proceeds to step S32, the transfer processing unit 66 supplies the music piece ID received by the processing in step S31 to the music piece managing unit 62, and a request is made to notify the file name of the corresponding music piece.

In step S33, the transfer processing unit 66 judges whether on not the file name has been notified by the music piece managing unit 62, and in the event that judgment is made that the file name has been notified, and the flow proceeds to step S34. In step S34, the transfer processing unit 66 reads out the music piece file corresponding to the file name notified by the processing in step S33 from one of the music piece file storing units 64-1 through 64-3 via the music piece managing unit 62 and the database 63, which is output (transferred) to unshown external equipment.

In step S33, in the event that judgment is made that the file name has not been notified by the music piece managing unit 62, i.e., in the event that judgment is made that notification has been made to the effect that the corresponding file name does not exist, the flow proceeds to step S35, the playing processing unit 65 issues an error to stop the process, so the processing ends.

Thus, as with the above-described case of the playing processing unit 65, the transfer processing unit 66 supplies the music piece ID to the music piece managing unit 62, and a request is made for notification of the file name of the music piece file corresponding to the music piece ID, whereby the music piece file is read out from the notified file name, and can be output (transferred) to the external equipment.

As described above, in the event that a certain file name cannot be found, the drive letter in the file name is changed and a search is performed again for other drives connected to the home network system, thereby allowing the file name of the certain music piece file to be obtained readily and speedily.

Also, of the drives connected to the home network system, drives containing a CPU 11 for executing various application programs of the personal computer 1, floppy disk drives (not shown), etc., require time to access, and thus are not searched.

Also, in the above, the file name can be obtained in a short time even in cases wherein there are changes in the drives connected to the home network system, so music piece files can be readily managed even in the event that many more music piece files are stored in the removable disk devices 3 and so forth. Also, in the above, even in the event that the drive configuration is changed, file names can be readily searched for, so media can be interchanged, thus realizing more flexible data management.

Further, the above can be applied to, in addition to music piece files, text files, image files, and so forth.

While the above series of processes can be executed by hardware, this can also be executed by software. In the event of executing the series of processes by software, the program making up the software is provided in dedicated hardware which is assembled into a computer, or is installed to, for example, a general-purpose personal computer, capable of executing various functions by installing various types of programs, from a program storing medium.

A program storing medium which stores the program to be installed in a computer so as to enable the computer to execute the program comprises, as shown in FIG. 2, packaged media such as magnetic disks 41 (including floppy disks), optical disks 42 (CD-ROMs (Compact Disk Read-Only Memory)), DVDs (Digital Versatile Disks), magneto-optical disks 43 (including MDI (Mini-Disks)), or semiconductor memory 44 or the like, or ROM 12 or a HDD 21 where the program is temporarily or permanently stored. Storing of the program to the program storing medium is performed using online or wireless communication media such as a Local Area Network, the Internet, digital satellite broadcasting, etc., via an interface such as a router or modem, as necessary.

In the present specification, the steps describing the programs stored in the program storing medium may of course be executed in the time sequence following the order in which they are listed, but are not restricted to being executed in this time sequence, and may be executed in parallel or individually.

Also, in the present specification, the term "system" represents all equipment made up of multiple devices.

With the information processing apparatus and method, and program stored in the program storing medium, according to the present invention, in the event that there is a data search request, the data files are obtained based on data identification information, and data stored in a corresponding other device is searched for based on a drive identification symbol contained in the obtained file name. In the event that, as the results of the search, the data is not found, drive information of other multiple devices connected to the network is obtained, a new file name with the drive identification symbol contained in the file name change is generated based on the obtained drive information, and data stored in the other devices connected to the network is searched, based on the generated new file name. Accordingly, music piece files can be readily and speedily searched for, even in the event that the drive configuration is changed.

What is claimed is:

1. An information processing apparatus for searching for data stored in a plurality of other devices via a network, said information processing apparatus comprising:

first obtaining means for obtaining a file name of said data, based on identification information of said data, in the event that there is a search request for said data;

first searching means for accessing a corresponding said other device, based on a drive identification symbol contained in said file name obtained by said first obtaining means, and searching said data stored therein;

second obtaining means for obtaining drive information of said plurality of other devices connected to said network, in the event that said data is not found as the result of searching with said first searching means;

first generating means for changing said drive identification symbol contained in said file name, based on said drive information obtained by said second obtaining means, and generating a new file name; and second searching means for accessing said other device connected to said network, based on said new file name generated by said generating means, and searching said data stored therein;

wherein if said file name is not found as a result of searching with said first searching means, then a portion of said file name received from said first obtaining means where a drive letter has been deleted is set to a value P, and wherein the value of P is set successively to drive information of each of the plurality of other devices until the file name is found and if the file name is not found then stopping the second searching means.

2. An information processing apparatus according to claim 1, further comprising storing means for storing said data identification information and said file name;

wherein said first obtaining means obtains said file name stored in said storing means, based on said data identification information regarding which there has been a search request.

3. An information processing apparatus according to claim 1, further comprising notifying means for notifying said file name obtained by said first obtaining means in the event that said data is found as the result of searching by said first searching means.

4. An information processing apparatus according to claim 1, further comprising notifying means for notifying a new file name generated by said generating means in the event that said data is found as the result of searching by said second searching means.

5. An information processing apparatus according to claim 1, further comprising notifying means for making notification to the effect that a search has failed in the event that said data is not found as the result of searching by said second searching means.

6. An information processing apparatus according to claim 1, wherein said file name is a path name containing said drive identification symbol.

7. An information processing method for an information processing apparatus for searching for data stored in a plurality of other devices via a network, said method comprising:

a first obtaining step for obtaining a file name of said data, based on identification information of said data, in the event that there is a search request for said data;

a first searching step for accessing a corresponding said other device, based on a drive identification symbol contained in said file name obtained by the processing in said first obtaining step, and searching said data stored therein;

a second obtaining step for obtaining drive information of said plurality of other devices connected to said network, in the event that said data is not found as the result of searching by the processing in said first searching step;

a first generating step for changing said drive identification symbol contained in said file name, based on said drive information obtained by the processing in said second obtaining step, and generating a new file name; and a second searching step for accessing said other device connected to said network, based on said new file name generated by the processing in said generating step, and searching said data stored therein;

wherein if said file name is not found as a result of searching with said first searching step, then a portion of said file name received from said first obtaining step where a drive letter has been deleted is set to a value P, and wherein the value of P is set successively to drive information of each of the plurality of other devices until the file name is found and if the file name is not found then stopping the second searching step.

8. A program storing medium storing a computer-readable program for controlling an information processing apparatus for searching for data stored in a plurality of other devices via a network, said program comprising:

code for a first obtaining step for obtaining a file name of said data, based on identification information of said data, in the event that there is a search request for said data;

code for a first searching step for accessing a corresponding said other device, based on a drive identification symbol contained in said file name obtained by the processing in said first obtaining step, and searching said data stored therein;

code for a second obtaining step for obtaining drive information of said plurality of other devices connected to said network, in the event that said data is not found as the result of searching in said first searching step;

code for a first generating step for changing said drive identification symbol contained in said file name, based on said drive information obtained by the processing in said second obtaining step, and generating a new file name; and code for a second searching step for accessing said other device connected to said network, based on said new file name generated by the processing in said generating step, and searching said data stored therein.

wherein if said file name is not found as a result of searching with said first searching step, then a portion of said file name received from said first obtaining step where a drive letter has been deleted is set to a value P, and wherein the value of P is set successively to drive information of each of the plurality of other devices until the file name is found and if the file name is not found then stopping the second searching step.

9. An information processing apparatus according to claim 1, further comprising:

a second generating means for generating a file name D+P from the set value P and a value D from drive letters obtained from a list of drive letters connected to said network.

10. An information processing method according to claim 7, further comprising:

a second generating step for generating a file name D+P from the set value P and a value D from drive letters obtained from a list of drive letters connected to said network.

* * * * *